(12) United States Patent
Lévesque et al.

(10) Patent No.: US 8,970,626 B2
(45) Date of Patent: Mar. 3, 2015

(54) SYSTEM, METHOD, AND COMPUTER PROGRAM PRODUCT FOR ADDING COMPUTER-GENERATED SCENE ELEMENTS INTO A REPRESENTATION OF A REAL-WORLD SCENE, USING PATH TRACING

(75) Inventors: Daniel Lévesque, Berlin (DE); Carsten Alexander Wätcher, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 331 days.

(21) Appl. No.: 13/449,222

(22) Filed: Apr. 17, 2012

(65) Prior Publication Data

US 2013/0271489 A1    Oct. 17, 2013

(51) Int. Cl.
*G09G 5/00*    (2006.01)

(52) U.S. Cl.
USPC .......................................................... 345/633

(58) Field of Classification Search
CPC .................... G06T 13/00–13/60; G06T 15/04; G06T 19/006; G06T 19/20; H04N 5/2224; H04N 9/75
USPC ......... 345/426, 629–641
See application file for complete search history.

(56) References Cited

U.S. PATENT DOCUMENTS

| | | | | |
|---|---|---|---|---|
| 5,777,623 | A | * | 7/1998 | Small .............................. 345/586 |
| 6,160,907 | A | * | 12/2000 | Robotham et al. ............. 382/154 |
| 6,720,963 | B2 | * | 4/2004 | Yoshida et al. ................ 345/420 |
| 7,631,277 | B1 | * | 12/2009 | Nie et al. ....................... 715/848 |

OTHER PUBLICATIONS

Haller et al., A Real-time Shadow Approach for an Augmented Reality Application Using Shadow Volumes, Proceedings of the ACM Symposium on Virtual Reality Software and Technology, Oct. 2003.*

* cited by examiner

*Primary Examiner* — Charles Tseng
(74) *Attorney, Agent, or Firm* — Zilka-Kotab, PC

(57) ABSTRACT

A system, method, and computer program product are provided for performing path tracing. In use, one or more matte objects are identified in a scene. Additionally, one or more synthetic objects are identified in the scene. Further, path tracing is performed within the scene, where the path tracing accounts for interactions between one or more of the matte objects and one or more of the synthetic objects.

18 Claims, 7 Drawing Sheets

SYSTEM, METHOD, AND COMPUTER PROGRAM PRODUCT FOR ADDING COMPUTER-GENERATED SCENE ELEMENTS INTO A REPRESENTATION OF A REAL-WORLD SCENE, USING PATH TRACING

FIELD OF THE INVENTION

The present invention relates to computer graphics, and more particularly to performing path tracing.

BACKGROUND

Image generation utilizing path tracing has become an important area of computer graphics. For example, path tracing may be used to produce images with a high degree of visual realism. However, current techniques for performing path tracing have been associated with various limitations.

For example, it may be difficult to perform certain operations (e.g., inserting objects into real photographs, etc.) utilizing (and taking full advantage of) current path tracing methodologies. There is thus a need for addressing these and/or other issues associated with the prior art.

SUMMARY

A system, method, and computer program product are provided for performing path tracing. In use, one or more matte objects are identified in a scene. Additionally, one or more synthetic objects are identified in the scene. Further, path tracing is performed within the scene, where the path tracing accounts for interactions between one or more of the matte objects and one or more of the synthetic objects.

DETAILED DESCRIPTION

Figure 1:
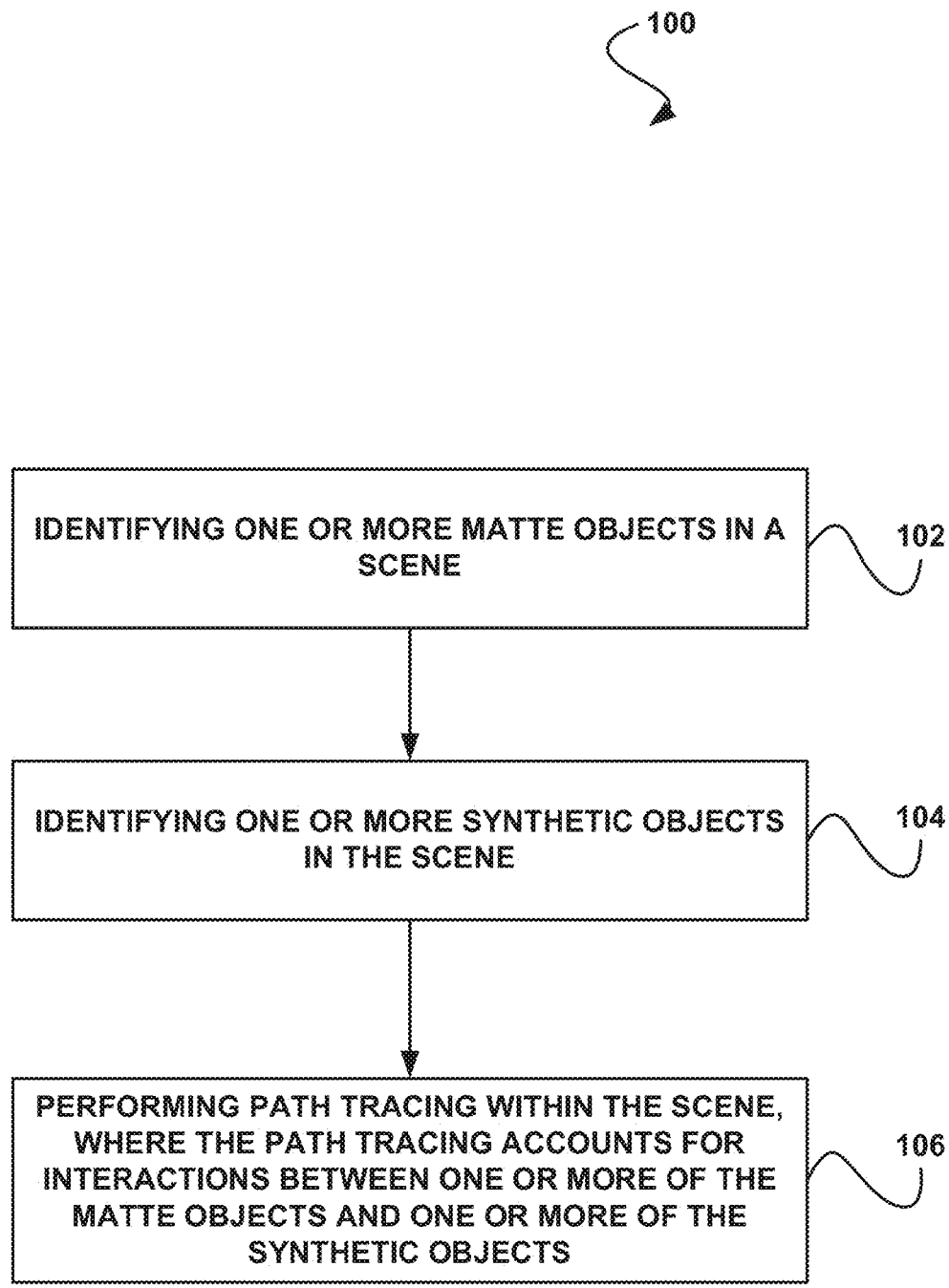
FIG. 1 shows a method for performing path tracing, in accordance with one embodiment.

FIG. 1 shows a method 100 for performing path tracing, in accordance with one embodiment. As shown in operation 102, one or more matte objects are identified in a scene. In one embodiment, the scene may include one or more images (e.g., one or more photographs (e.g., backplate photographs, etc.), one or more scenes from a video, one or more scenes from an animation sequence, etc.). In another embodiment, the scene may include an environment map, a backplate, etc. For example, an environment map may include a spherical (or hemispherical) texture map which may include a (potentially approximate) representation of the surrounding elements to the scene being rendered. In another embodiment, the environment map may include a photograph in which synthetic objects are attempted to be integrated. In another example, the backplate may include an aggregation of zero or more camera backplates and the environment map.

Additionally, in one embodiment, the one or more matte objects may include one or more objects added to the scene. In another embodiment, the scene may include a real-life scene, and one or more matte objects may be added to the scene as a substitute for one or more existing elements within the real-life scene. For example, a photograph within the scene may include a plurality of photograph objects, and one or more matte objects may be added to the scene to stand in as one or more of the photograph objects to help with path tracing associated with the one or more photograph objects.

In yet another embodiment, the one or more matte objects may be modeled to match features of the real-life scene. For example, the one or more matte objects may be modeled to match features of a backplate photograph of the scene. In another embodiment, the one or more matte objects may perfectly overlap one or more existing elements of the real-life scene that are substituted by the one or more matte objects. In yet another embodiment, the one or more matte objects may be identified as matte objects utilizing a flag. For example, the one or more matte objects may be tagged as matte objects using at least one Boolean flag. In still another embodiment, the one or more matte objects may include a physical object (e.g., a geometric object, etc.), a light source, emissive geometry, etc.

Further, as shown in operation 104, one or more synthetic objects are identified in the scene. In one embodiment, the one or more synthetic objects may include one or more objects added to the scene. In another embodiment, the one or more synthetic objects may be added to the scene in addition to existing objects within the scene. For example, a photograph within the scene may include a plurality of photograph objects, and one or more synthetic objects may be added to the scene in addition to the photograph objects. In yet another embodiment, the one or more synthetic objects may include a physical object (e.g., a geometric object, etc.), a light source, emissive geometry, etc. In yet another embodiment, the one or more synthetic objects may be identified as synthetic objects utilizing a flag. For example, the one or more synthetic objects may be tagged as synthetic objects using at least one Boolean flag.

Further still, as shown in operation 106, path tracing is performed within the scene, where the path tracing accounts for interactions between one or more of the matte objects and one or more of the synthetic objects. In one embodiment, the path tracing may include any technique where a path is traced through the scene. In another embodiment, the path tracing may include tracing a path through a scene and determining interactions between the path and objects within the scene (e.g., matte objects, synthetic objects, photograph objects, etc.).

Also, in one embodiment, the path tracing may include the tracing of a path of light from a light source through pixels of the scene to a view point (e.g., a camera, an eye, etc.) and simulating the effects of interactions between the path of light and one or more objects within the scene. For example, the path tracing simulation may include different variations of ray tracing techniques such as forward and backward path tracing, light tracing, bidirectional path tracing, etc. In addition, in one embodiment, performing the path tracing within the scene may include determining whether the path intersects (e.g., hits, etc.) a synthetic object. In another embodiment, if it is determined that the path intersects the synthetic object, then the material assigned to the synthetic object is evaluated to determine where the path is going to go, what the path is going to do, etc.

Furthermore, in one embodiment, performing the path tracing within the scene may include determining whether the path intersects (e.g., hits, etc.) a matte object. In another embodiment, if it is determined that the path intersects the matte object, it may then be determined whether the path then intersects another matte object, a synthetic object, or another scene object (e.g., an object other than a matte object or a synthetic object, such as an environment object, a photograph object, etc.).

Further still, in one embodiment, if it is determined that the path intersects the matte object, and if it then is determined that the path intersects another matte object or another scene object, an existing shading provided by the scene may be used with respect to the matte object. For example, one or more images within the scene may have associated shading resulting from the creation of the image itself that is not associated with the path tracing (e.g., "pre-baked" shading, etc.). For instance, a photograph in the scene may include a shading of objects captured by the camera that took the photograph. In another example, the associated shading may be used with respect to the matte object, without performing any additional shading evaluation.

Also, in one embodiment, if is first determined that the path intersects the matte object, and if it then is determined that the path intersects a synthetic object, a shading evaluation may be performed with respect to the matte object and the synthetic object, where such shading evaluation may replace an existing shading provided by the backplate or environment of the scene. For example, the material of the matte object and the synthetic object may be evaluated. Additionally, an interaction between the matte object and the synthetic object may be determined. Further, shading of both the matte object and the synthetic object may be calculated according to the path. Further still, such shading may replace an associated (e.g., "pre-baked," etc.) shading of one or more images in the scene that resulted from the creation of the images and that was not associated with the path tracing.

In another embodiment, one or more artificial shadows may be computed in association with the one or more matte objects and the one or more synthetic objects. For example, if a synthetic object is inserted between a matte light and matte object within the scene, an artificial shadow may be computed by sampling matte lights whenever a matte object is hit, and multiplying an environment map color by a transparency of a shadow ray.

In this way, the one or more matte objects of the scene may act as stand-in objects for one or more specific elements of one or more images of the scene. Additionally, such matte objects may interact with the one or more synthetic objects during rendering, which may enable realistic shading and a realistic overall scene during the rendering when the one or more synthetic objects are inserted into the scene.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
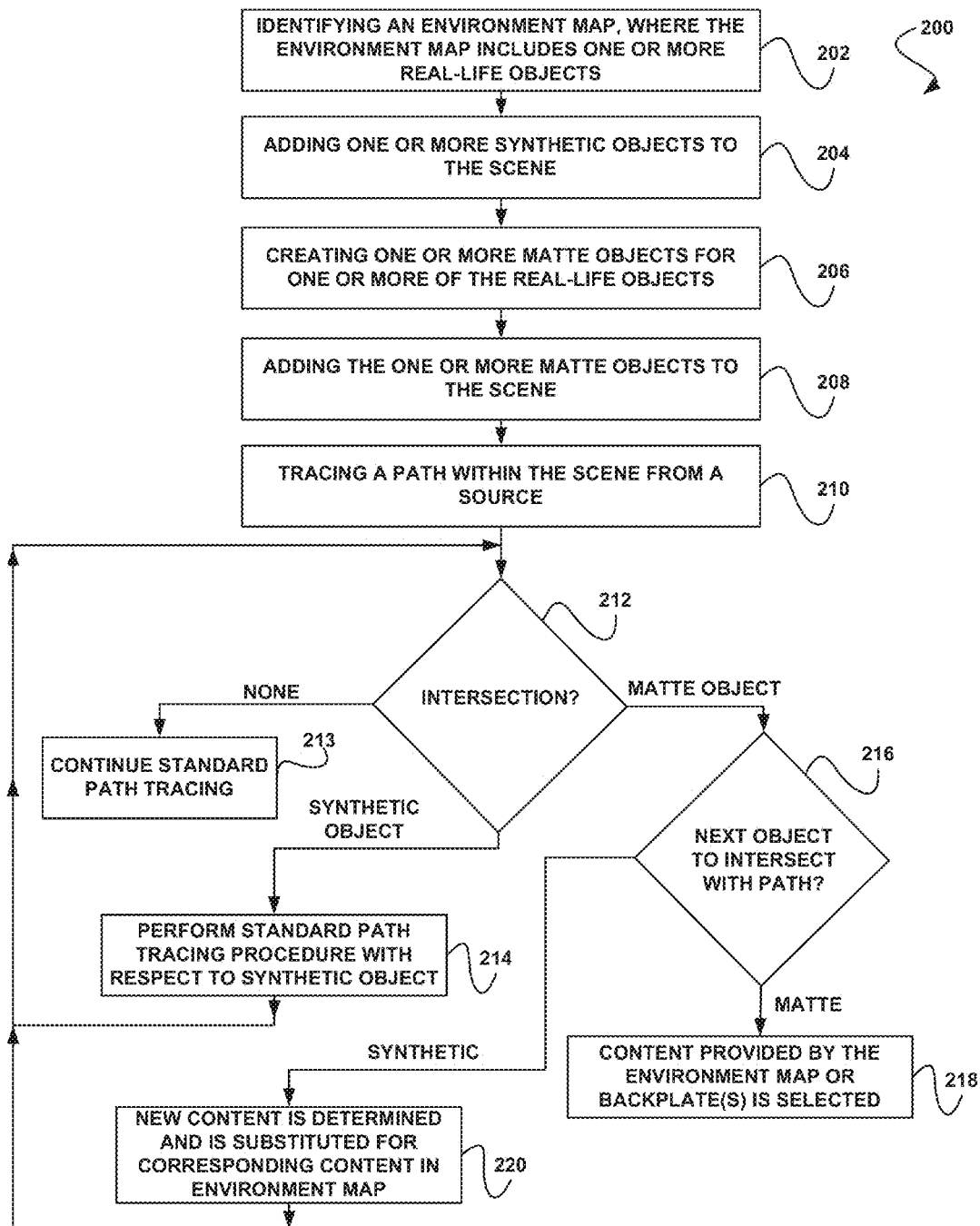
FIG. 2 shows a method for performing path tracing utilizing matte objects, in accordance with another embodiment.

FIG. 2 shows a method 200 for performing path tracing utilizing matte objects, in accordance with another embodiment. As an option, the method 200 may be carried out in the context of the functionality of FIG. 1. Of course, however, the method 200 may be implemented in any desired environment.

It should also be noted that the aforementioned definitions may apply during the present description.

As shown in operation 202, an environment map is identified, where the environment map includes one or more real-life objects. In one embodiment, the environment map may include one or more photographs. In another embodiment, the environment map may include zero or more backplates. For example, the environment may include a combination of a spherical or hemispherical two-dimension texture and zero or more optional two-dimensional background textures.

Figure 3:
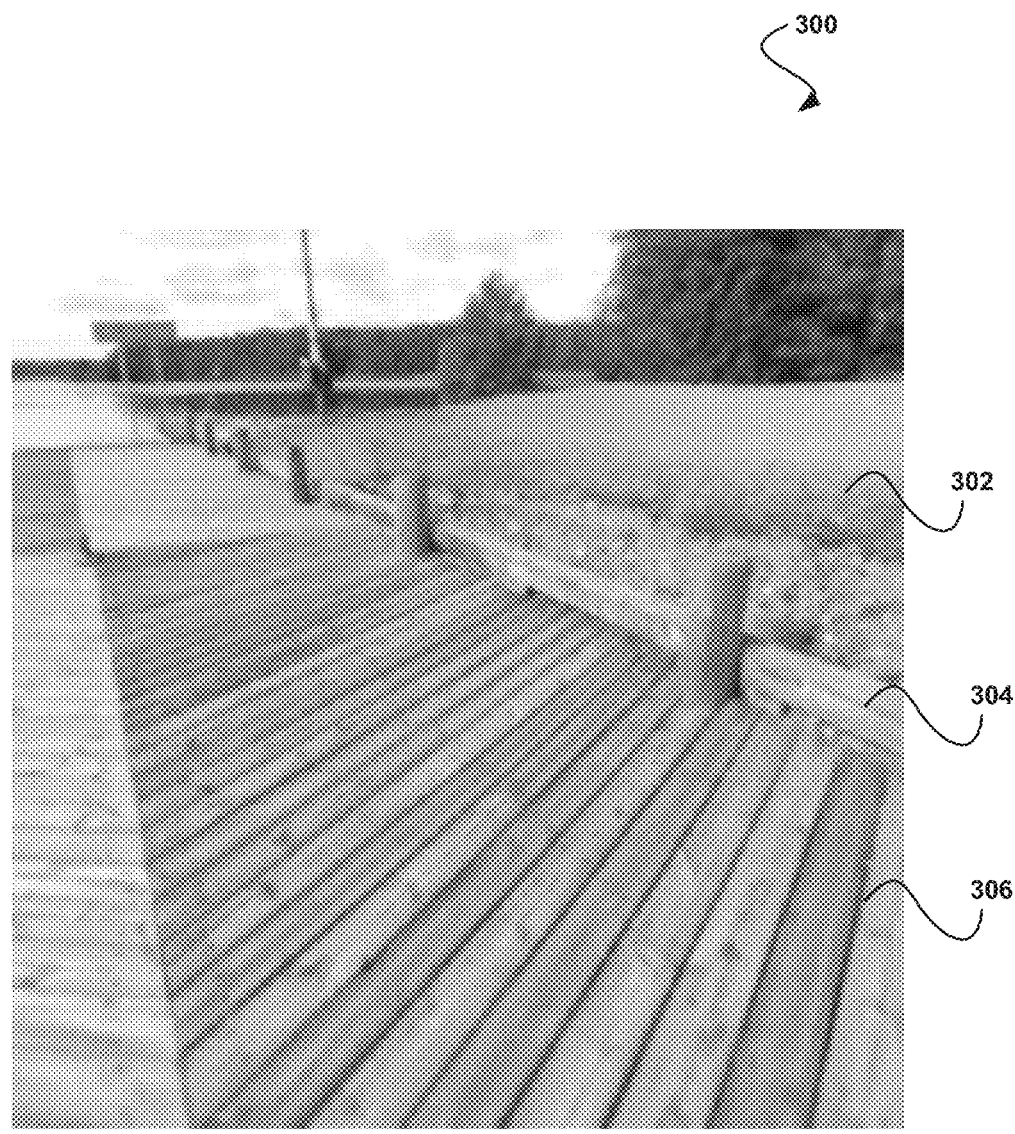
FIG. 3 illustrates an exemplary scene, in accordance with yet another embodiment.

Additionally, in one embodiment, the one or more real-life objects may include one or more objects found within the environment map. For example, the one or more real-life objects may include objects shown within a photograph. FIG. 3 illustrates an exemplary scene 300, including objects such as a gravel road 302, a fence 304, and a wooden dock 306. In another embodiment, shading may be provided by the environment may for the one or more real-life objects. For example, the environment map may include "pre-baked" shading for each of the one or more environment map objects within the environment map.

Figure 4:
FIG. 4 illustrates an exemplary scene, in accordance with yet another embodiment.

Further, as shown in operation 204, one or more synthetic objects are added to a scene. In one embodiment, each of the one or more synthetic objects may include a computer-generated (CG) object. For example, each of the one or more synthetic objects may include objects not originally found in a photograph that are added to the photograph at a later date. FIG. 4 illustrates an exemplary scene 400, where the scene 400 includes an environment map and a synthetic object 402 (in this case, computer generated lumber) has been added to the exemplary scene 400.

Further still, as shown in operation 206, one or more matte objects are created for one or more of the real-life objects. In one embodiment, a matte object may be created for each of the real-life objects of the environment map. In another embodiment, a matte object may be created for a portion of the real-life objects of the environment map. In yet another embodiment, the matte object may have the same dimensions as the real-life object for which it is created.

Figure 5:
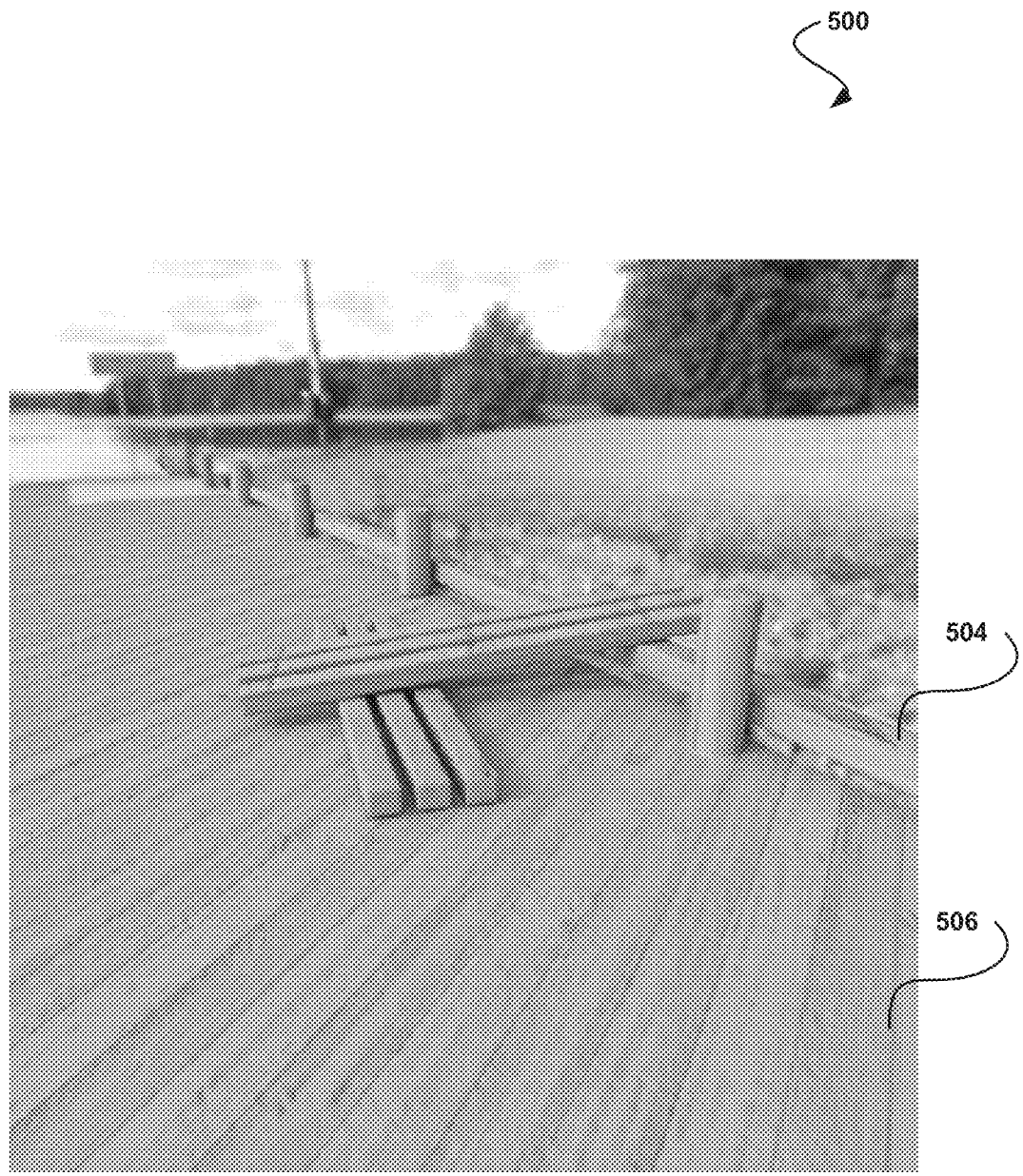
FIG. 5 illustrates yet another exemplary scene, in accordance with yet another embodiment.

Also, as shown in operation 208, the one or more matte objects are added to the scene. In one embodiment, the scene may include the environment map, and each of the one or more matte objects may be overlaid upon their corresponding real-life object within the scene. FIG. 5 illustrates yet another exemplary scene 500, where matte objects such as a matte fence 504 and a matte wooden dock 506 are overlaid upon the fence and wooden dock of the scene 500.

In addition, as shown in operation 210, a path within the scene is traced from a source. In one embodiment, the path may include a light path. In another embodiment, the path may be traced in order to determine a shading of one or more objects within the scene. In another embodiment, the path may be traced as part of a rendering operation (e.g., the rendering of the environment map, the one or more matte objects, and the one or more synthetic objects, etc.). Further, as shown in operation 212, it is determined whether the path intersects with an object in the scene. If it is determined in operation 212 that the path does not intersect with an object in the scene, a standard path tracing technique continues, with (for example) an evaluation of the environment map or backplate.

Further still, if it is determined in operation 212 that the path intersects with a synthetic object in the scene, then in operation 214, a standard path tracing procedure is performed with respect to the synthetic object and path tracing is continued within the scene, where another path intersection determination is performed, as shown in operation 212. In one embodiment, performing the standard path tracing procedure with respect to the object may include evaluating the material of the object to determine how the path reacts to its intersection with the synthetic object. For example, a bi-directional scattering distribution function (BSDF) of the object may be evaluated.

Also, if it is determined in operation 212 that the path intersects with a matte object in the scene, then in operation 216, the next object to intersect with the path is determined. In one embodiment, a standard path tracing procedure may also be performed with respect to the matte object. Additionally, if it is determined in operation 216 that the next object to intersect with the path is another matte object or an environment map object, then in operation 218 content provided by the environment map or backplate(s) is selected. In one embodiment, the content provided by the environment map may include one or more shading characteristics provided by the environment map (e.g., "pre-baked" shading, etc.) with respect to the matte object and the next object to intersect with the path.

Further, if it is determined in operation 216 that the next object to intersect with the path is a synthetic object, then in operation 220 new content associated with the interaction between the path, the matte object, and the synthetic object is determined, and such new content substitutes corresponding content in the environment map. For example, the new content may substitute characteristics provided by the environment map (e.g., "pre-baked" shading, etc.). In another embodiment, determining the new content may include evaluating the matte object as a synthetic object. Additionally, another path intersection determination is performed, as shown in operation 212.

Figure 6:
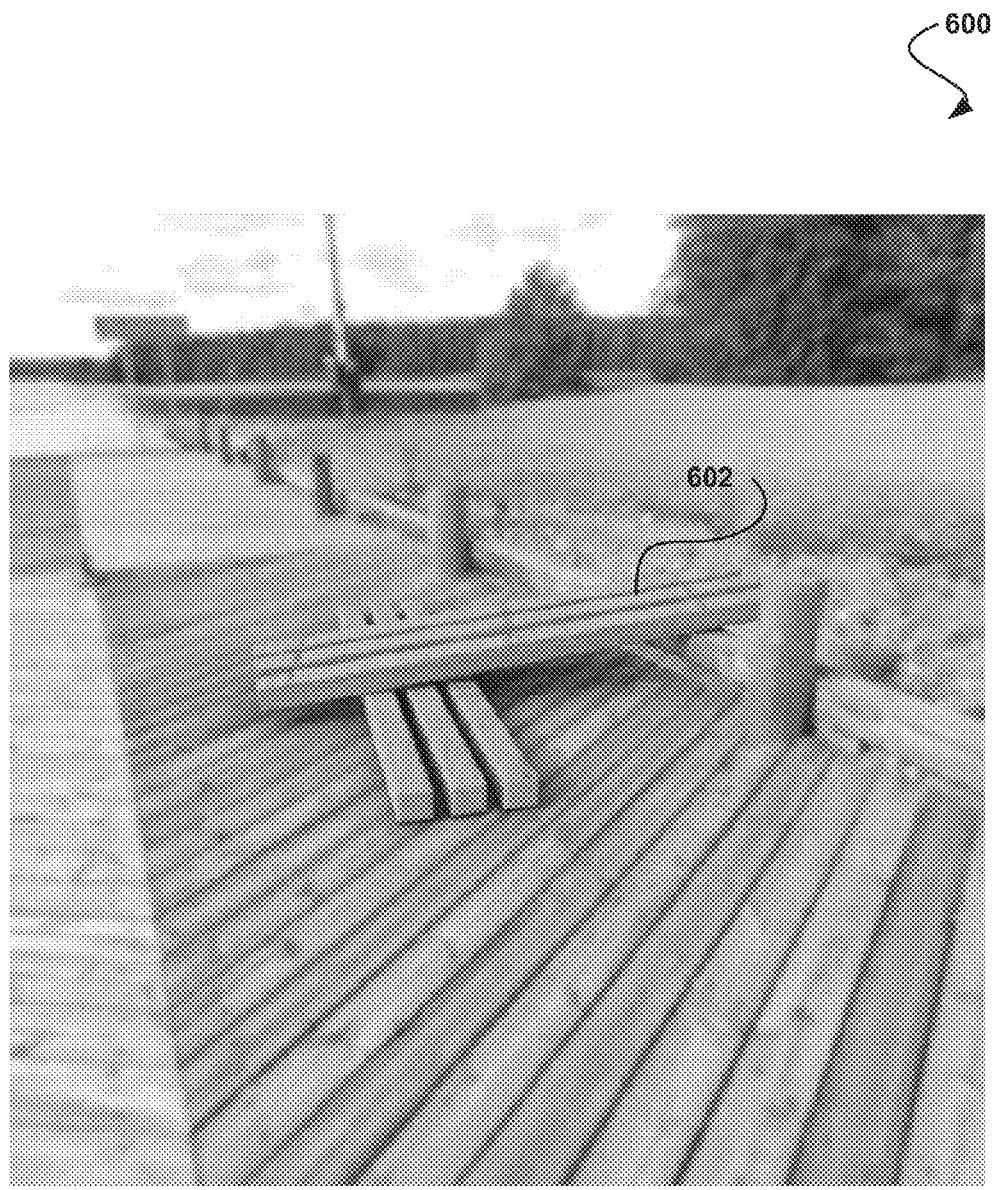
FIG. 6 illustrates still another exemplary scene, in accordance with yet another embodiment.

In this way, the one or more synthetic objects may be added to the scene during rendering, where the one or more matte objects may stand in for one or more real-life objects with which the one or more synthetic objects interact. Additionally, when a matte object is intersected by a path, behavior may remain consistent with what a user would expect when it comes to the environment map interacting with the path. FIG. 6 illustrates still another exemplary scene 600, where a synthetic object 602 is correctly shaded with respect to the scene 600 onto which the synthetic object 602 has been added, such that the synthetic object 602 appears to blend in with the scene 600. In one embodiment, the rendering may be performed utilizing one or more processors (e.g., a central processing unit (CPU), a graphics processing unit (GPU), etc.). In another embodiment, the rendering may be performed using completely physically-based renderers (e.g., physically based ray and path tracing based renderers, etc.).

Additionally, in one embodiment, the environment map may be projected onto matte objects from a camera position. The environment map may be assumed to contain an already-shaded version of the matte objects, such that any shading of the matte objects may return the exact environment map (or backplate color, which may potentially be modified by additive or subtractive effects. In another embodiment, interactions such as the reflection and/or refraction of matte objects onto other matte objects may be ignored, since such interactions may already be part of the environment map. These interactions may include lighting of matte lights onto matte objects and shadow casting of matte light through matte objects onto other matte objects.

Further, in one embodiment, when hitting a back side of a matte object, the environment map may still be projected as if the front side was hit. This may result in a symmetric look for the object. In another embodiment, a user may specify multiple environment (backplate) maps, projected from different positions, which may result in realistic projections on the back sides of matte objects.

Further still, in one embodiment, matte objects may interact with synthetic objects in multiple ways. For example, matte objects may occlude synthetic objects that lie behind them. In another example, matte objects may reflect/refract synthetic objects (this may include a subtractive effect where a part of the environment map may be replaced by a reflection of a synthetic object). In another embodiment, illumination may be received from synthetic object geometric lights, and shadows may be cast by synthetic object lights through synthetic objects onto matte objects. In yet another embodiment, synthetic objects may occlude matte lights, and may cast shadows onto matte objects, which may require subtracting some light from the environment map. In still another embodiment, synthetic object lights may illuminate matte objects. This may be an additive effect since no occlusion may take place.

Also, in one embodiment, a backplate may include a combination of a spherical or hemispherical environment and one or more optional 2D backgrounds. In another embodiment, any matte object that ties within a view of the camera may receive the background texture projected onto it, otherwise it may receive a spherical treatment. Multiple cameras may be defined to project multiple 2D backgrounds from multiple positions. In yet another embodiment, the environment may include a matte light source.

In addition, in one embodiment, the background color may be overridden, (e.g., to black, etc.) in order to facilitate compositing of a background image post-render, such a color is provided, the background texture may still be used and projected onto matte objects which are reflected by CG objects. This may be necessary as such interactions may hardly be composited post-render, especially since these pixels may get a fully opaque alpha.

Further, in one embodiment, if a synthetic object is inserted between a matte light and matte object, an artificial shadow may be computed. For example, this may be performed by sampling the matte lights whenever a matte object is hit, and multiplying the environment map color by the transparency of the shadow ray. In another embodiment, to improve realism, a shadow algorithm may take into account the color of the light being sampled. The final color may not only be modulated by the transparency of the shadow ray, but also by the complement of the light's normalized color value.

Further still, in one embodiment, if a matte object is hit by a shadow ray, it may be assumed that the shadow is already taken into account by the environment map, so the shadow ray may be discarded entirely and may behave as if the light was not shadowed. In another embodiment, if the matte object is transparent, the shadow ray may only have partial impact. For this, the final color may be calculated as if no matte objects had been hit, and the result may be interpolated between a shadowed and unshadowed environment map, where the interpolation scale may include the total transparency of all matte objects hit by the shadow path. This may imply that all shadow paths be fully traced unless a fully opaque matte object is hit.

Also, in one embodiment, a path may be flagged as being a matte sub-path whenever the last object hit was a matte object. Table 1 illustrates exemplary behavior associated with a path flagged as a matte sub-path. Of course, it should be noted that the behavior shown in Table 1 is set forth for illustrative purposes only, and thus should not be construed as limiting in any manner.

TABLE 1

1. A regular (non-matte) path hits:

1. Matte object: the path may be flagged as a matte path. The backplate/environment may be evaluated, artificial shadows may be added, and the result may be set aside for potential future use (e.g. as "deferredmatte contribution").
   2. Synthetic object: continue the path normally.
   3. Environment: evaluate the environment normally.

2. A matte path hits:

1. Matte object: the path may continue normally (the path may remain a matte path, the environment may not be evaluated).
   2. Synthetic object: the matte object first hit by the current matte sub-path has reflected/refracted (directly or indirectly through other matte objects) this synthetic object. Whatever value extracted from the backplate/environment ("deferred matte contribution") may be discarded and the path is continued normally. The path may no longer be flagged as a matte path.
   3. Environment: the matte object reflected/refracted the environment, either directly or indirectly through another matte object. This contribution may be already taken into account by the backplate, so the path may be terminated and the backplate may be evaluated, where the first matte object hit by the sub-path (e.g. "deferred matte contribution") may be added to the total path contribution.

In addition, in one embodiment, the algorithm described above may assume that all interactions may be accounted by hitting objects and geometric lights. But since lights may also be sampled (e.g., area, point, and environment) additional logic may be necessary. For example, when shading a matte object, only synthetic lights may be sampled. The result may be added to the total path contribution. In another example, lights may have a subtractive contribution. In yet another example, when continuing a path after intersecting a matte object, all matte lights may be disabled if hit (i.e. their emission may be overridden to black).

Further, in another embodiment, when shading a synthetic object, all lights may be sampled, but if a matte light is sampled, then any matte object intersected by the shadow ray may be fully occluding (e.g., it may be assumed that the lighting and shadowing may be taken into account by hitting that matte object). In yet another embodiment, when tracing a path out of a synthetic object, all lights may be intersected and evaluated normally.

Also, in one embodiment, the alpha component may store the ratio of the original environment which is still visible in the final image. Subtractive effects may reduce the alpha value, while additive effects (e.g. light sampling, etc.) may not.

In this way, rendering may be performed in a much simpler manner for a user, while remaining physically consistent. Additionally, artificial shadows may be calculated very efficiently and may accurately represent real-world shadows. Further, synthetic shading effects added to the backplate may be calculated using standard material/shader definitions, which may make it easy for a user to match real-world shading with the full palette of effects offered by a complete material description (including reflection, transparency, sub-surface scattering, etc.).

Further still, all logic for automatically rendering objects may be handled correctly and may not need additional manual tuning. This may simplify workflow since a set of special tags may not need to be assigned to matte objects, and individual controls (e.g. light lists) on each object may be avoided.

Figure 7:
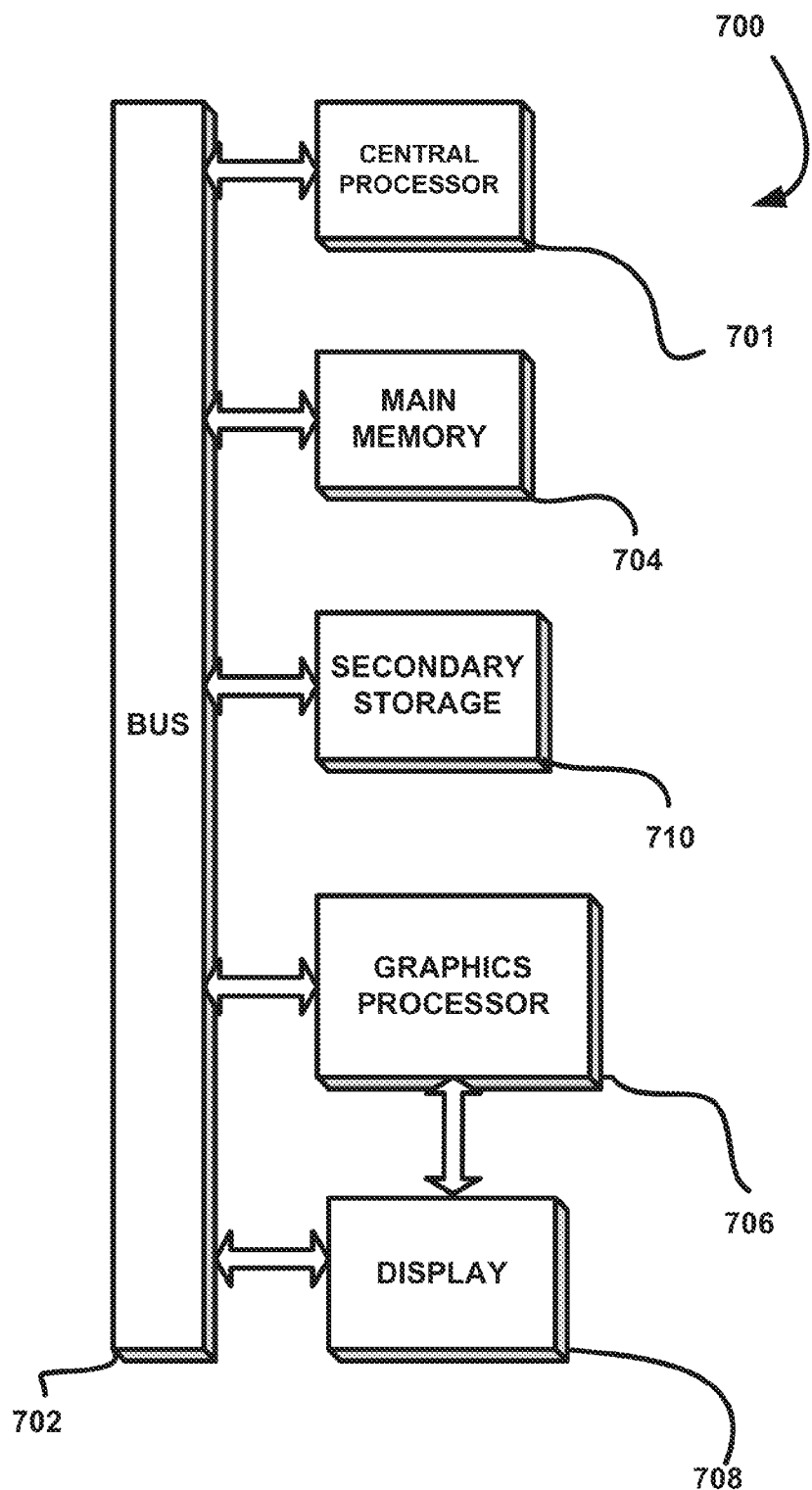
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one host processor 701 which is connected to a communication bus 702. The system 700 also includes a main memory 704. Control logic (software) and data are stored in the main memory 704 which may take the form of random access memory (RAM).

The system 700 also includes a graphics processor 706 and a display 708, i.e. a computer monitor. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the system 700 to perform various functions. Memory 704, storage 710 and/or any other storage are possible examples of computer-readable media.

In one embodiment, the architecture and/or functionality of the various previous figures may be implemented in the context of the host processor 701, graphics processor 706, an integrated circuit (not shown) that is capable of at least a portion of the capabilities of both the host processor 701 and the graphics processor 706, a chipset a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, and/or any other type of logic. Still yet, the system 700 may take the form of various other devices m including, but not limited to a personal digital assistant (PDA) device, a mobile phone device, a television, etc.

Further, while not shown, the system 700 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying one or more matte objects in a scene that includes an environment map that includes one or more spherical or hemi-spherical textures that include a representation of one or more real-life objects, wherein each matte object in the one or more matte objects represents a corresponding real-life object;
identifying one or more synthetic objects in the scene; and
performing, via a processor, path tracing within the scene by:
tracing a path within the scene from a source;
determining whether the path intersects with a matte object or a synthetic object; and
if the path intersects the synthetic object, performing a standard path tracing procedure with respect to the synthetic object, or
if the path intersects the matte object, determining a next object to intersect with the path and:
if the next object is another matte object or an environment map, selecting content included within the environment map, or
if the next object is a synthetic object, substituting new content associated with an interaction between the matte object and the synthetic object for corresponding content in the environment map.

2. The method of claim 1, wherein the scene includes one or more photographs.

3. The method of claim 1, wherein the one or more matte objects are modeled to match features of the real-life objects.

4. The method of claim 1, wherein the one or more matte objects overlap one or more real-life objects represented in the environment map.

5. The method of claim 1, wherein the one or more matte objects are identified as matte objects utilizing a flag.

6. The method of claim 1, wherein the one or more matte objects include a geometric object.

7. The method of claim 1, wherein the one or more synthetic objects include a light source.

8. The method of claim 1, wherein the path tracing is performed utilizing one or more ray tracing techniques such as forward and backward path tracing, light tracing, and bidirectional path tracing.

9. The method of claim 1, wherein the new content replaces the corresponding content that resulted from the creation of one or more captured images and that was not associated with the path tracing.

10. The method of claim 1, wherein the one or more synthetic objects are identified as synthetic objects utilizing a flag.

11. The method of claim 1, wherein the path tracing is performed during rendering.

12. The method of claim 1, further comprising computing one or more artificial shadows in association with the one or more matte objects and the one or more synthetic objects.

13. The method of claim 1, wherein the scene includes at least two environment maps, each environment map projected from different positions.

14. The method of claim 1, wherein the interaction between the matte object and the synthetic object comprises determining an occlusion between objects.

15. The method of claim 1, wherein the interaction between the matte object and the synthetic object comprises determining a reflection or refraction associated with objects.

16. A computer program product embodied on a non-transitory computer readable medium, comprising:
code for identifying one or more matte objects in a scene that includes an environment map that includes one or more spherical or hemi-spherical textures that include a representation of one or more real-life objects, wherein each matte object in the one or more matte objects represents a corresponding real-life object;
code for identifying one or more synthetic objects in the scene; and
code for performing path tracing within the scene by:
tracing a path within the scene from a source;
determining whether the path intersects with a matte object or a synthetic object; and
if the path intersects the synthetic object, performing a standard path tracing procedure with respect to the synthetic object, or
if the path intersects the matte object, determining a next object to intersect with the path and:
if the next object is another matte object or an environment map, selecting content included within the environment map, or
if the next object is a synthetic object, substituting new content associated with an interaction between the matte object and the synthetic object for corresponding content in the environment map.

17. A system, comprising:
a processor for:
identifying one or more matte objects in a scene that includes an environment map that includes one or more spherical or hemi-spherical textures that include a representation of one or more real-life objects, wherein each matte object in the one or more matte objects represents a corresponding real-life object;
identifying one or more synthetic objects in the scene, and
performing path tracing within the scene by:
tracing a path within the scene from a source;
determining whether the path intersects with a matte object or a synthetic object; and
if the path intersects the synthetic object, performing a standard path tracing procedure with respect to the synthetic object, or
if the path intersects the matte object, determining a next object to intersect with the path and:
if the next object is another matte object or an environment map, selecting content included within the environment map, or
if the next object is a synthetic object, substituting new content associated with an interaction between the matte object and the synthetic object for corresponding content in the environment map.

18. The system of claim 17, wherein the processor is coupled to a memory via a bus.

* * * * *